United States Patent [19]

Murachi

[11] Patent Number: 4,587,149
[45] Date of Patent: May 6, 1986

[54] ELECTROSTATIC FLOCKING PRODUCTS WITH POLYURETHANE ADHESIVE

[75] Inventor: Tatsuya Murachi, Nishikasugai, Japan

[73] Assignee: Toyoda Gosei Co., Ltd., Nishikasugaigun, Japan

[21] Appl. No.: 711,483

[22] Filed: Mar. 13, 1985

[30] Foreign Application Priority Data

Mar. 13, 1984 [JP] Japan .................................. 59-48890

[51] Int. Cl.$^4$ .............................................. B05D 1/14
[52] U.S. Cl. ...................................... 428/90; 428/97
[58] Field of Search ................................. 428/90, 97

[56] References Cited

U.S. PATENT DOCUMENTS 4,482,593 11/1984 Sagel et al. ........................ 428/90

Primary Examiner—Marion C. McCamish
Attorney, Agent, or Firm—Cushman, Darby & Cushman

[57] ABSTRACT

An electrostatic flocking product in which flocks are fixed to the surface of a base material through an adhesive layer. The adhesive layer of the electrostatic flocking product is formed by polyurethane prepared by curing a mixture of an isocyanate prepolymer and polyisocyanate, with water, and the polyol raw material for the foregoing isocyanate prepolymer is a mixture of a high polyol as the main component and triethanolamine in a specific mixing ratio. The electrostatic flocking product of this invention has sufficiently high abrasion resistance at the flocked surface and the foregoing water-cured polyurethane for forming the adhesive layer of the electrostatic flocking product of this invention shows good coating workability at the formation of the adhesive layer.

4 Claims, 1 Drawing Figure

ELECTROSTATIC FLOCKING PRODUCTS WITH POLYURETHANE ADHESIVE

BACKGROUND OF THE INVENTION (1) Field of the Invention

This invention relates to an electrostatic flocking product and more particularly to an electrostatic flocking product in which flocks are fixed to the surface to be flocked of a base material through an adhesive layer formed by polyurethane prepared by curing a mixture of an isocyanate prepolymer and polyisocyanate, with water.

(2) Description of the Prior Art

Since an electrostatic flocking product can easily impart soft and graceful visual and tactile feelings to the surface thereof regardless of the kind of the base material used, these products are widely used as textile goods such as clothes, footwares, bags, interior decorations, etc, as well as for electric products such as home warmers, etc., and motorcar parts such as garnishes, trims, weather-strips, glass runs, etc.

As a polymer forming adhesive layers for these electrostatic flocking products, a polyacrylic acid ester, a synthetic rubber (e.g., polychloroprene), polyvinyl acetate, etc., are usually used. However, these polymers are insufficient in abrasion resistance of the flocked surface, in particular, in abrasion resistance thereof under severe using conditions. Accordingly, electrostatic flocking products in which the adhesive layers are formed by water-cured polyurethane having excellent abrasion resistance have now been marketed. The water-cured polyurethane contains in the polyol raw material (mainly composed of high molecular polyols) a small amount of low molecular polyols (e.g., ethylene glycol, porpylene glycol, etc.,) for increasing the heat resistance thereof. The low molecular polyol densifies the distribution of the urethane bond and the aromatic nuclei in the isocyanate prepolymer chain, whereby it contributes to the improvement of the abrasion resistance, heat ressitance, etc., of the flocked surfaces of the electrostatic flocking products, but the presence of the low-molecular polyol increases the intermolecular force of isocyanate prepolymers and decreases the fluidity of the adhesive, which give bad influences on the coating operation for the adhesive layer. In order to improve the fluidity of the adhesive coating composition to a coatable extent, it is necessary to add a large amount of a chlorine series solvent which added at reaction or to use an ignitable polar solvent together with the chlorine series solvent. In the former case, however, the concentration of solid components in the adhesive is lowered, whereby a desired layer thickness (usually 80 to 120 μm) of the adhesive layer is reluctant to obtain by one coating and in the latter case, the coating environment must be cared, which give also bad influences on the coating operation. Furthermore, since the upper limit of the mixing amount of the low molecular polyol to a high molecular polyol is about 0.1 mole (if the amount is over this limit, the adhesive is gelled to make coating impossible), there is a limit on the improvement for the abrasion resistance (particularly, after heat aging) of the flocked surface.

SUMMARY OF THE INVENTION

This invention relates to an electrostatic flocking product in which flocks are fixed to the surface of a base material through an adhesive layer. The adhesive layer of the electrostatic flocking product of this invention is composed of polyurethane formed by curing a mixture of an isocyanate prepolymer and polyisocyanate, with water, and the polyol raw material for the isocyanate prepolymer is a mixture of a high molecular polymer as the main component and 0.4 to 1.5 moles of triethanolamine per mole of the high molecular polyol.

The electrostatic flocking product of this invention having the above-described construction shows a sufficient abrasion resistance at the flocked surface thereof even under severe using conditions and also in the electrostatic flocking product of this invention, the coating operation of the adhesive coating composition can be smoothly performed at the formation of the adhesive layer. Accordingly, the electrostatic flocking product of this invention can be applied to the field (particualrly, outdoor use parts) the application for which is restricted in the case of conventional electrostatic flocking products.

DESCRIPTION OF THE PREFERRED EMBODIMENT

Figure 1:
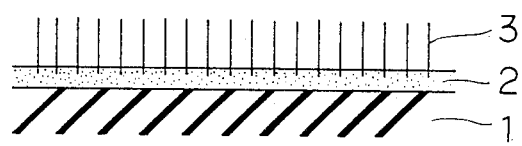
FIG. 1 is a schematic sectional view showing a part of an example of the electrostatic flocking product of this invention.

As shown in FIG. 1, the electrostatic flocking product is composed of a base material 1 of a rubber, a plastic, a metal, etc., having fixed on the surface thereof flocks 3 through an adhesive layer 2. The flocks 3 are composed of polyamide fibers, polyester fibers, rayon fibers, etc., which are cut in a state of tow and subjected to dyeing and electrodeposition treatment.

The raw materials for water-cured polyurethane for forming the adhesive layer 2 in this invention are as follows.

(A) Polyol raw material:

A mixture of a high molecular polyol as the main component and 0.4 to 1.5 moles, preferably 0.6 to 1.0 mole of triethanolamine per mole of the high molecular polyol.

If the content of triethanolamine is over the above-described compounding range, good results cannot be obtained in abrasion resistance, in particular, abrasion resistance after heat aging, after metting test and after weathering test etc. As the foregoing high molecular polyol, two or more functional polyether polyol, polyester polyol, etc., having a mean molecular weight of 800 to 5,000 are used. If the mean molecular weight is less than 800, the proportion of the urethane bonds in the main chain is increased to reduce the fluidity of the adhesive coating composition, while if the mean molecular weight is larger than 5,000, the distance between the urethane bonds becomes large to reduce the abrasion resistance under room temperature and high temperature.

Examples of the polyether polyol are diols such as polypropylene glycol, polyethylene glycol, polypropylene-ethylene glycol, etc., and triols such as a propylene oxide-glycerol reaction product, a propylene oxide-trimethylolpropane reaction product, etc.

Examples of the polyester polyol are adipic acid esters such as polypropylene adipate, polybutylene adipate, etc.

(B) Polyisocyanate component:

As the component, 4,4'-diphenylmethane diisocyanate, 2,4-tolylene diisocyanate, 2,6-tolylene diisocyanate, xylene diisocyanate, 1-methoxyphenyl-2,4-diisocyanate, 4,4'-biphenylene diisocyanate, 3,3'-dimethyl-4,4'-biphenylene diisocyanate, 4,4',4"-triphenylmethane diisocyanate, etc., can be used.

By reacting the above-described polyol component (A) and the above-described polyisocyanate component (B) at an equivalent ratio of OH/NCO=1/1.5 to 1/7 in a solvent such as trichloroethylene, etc., according to an ordinary manner, the adhesive composed of the isocyanate prepolymer and the unreacted polyisocyanate in this invention can be obtained. In this case, if NCO is less than 1.5 equivalent, the abrasion resistance in a hot atmosphere is reduced, while if NCO is over 7 equivalent, the after weathering test and after wetting test abrasion resistance normal state is reduced.

The adhesive thus obtained has a solid component concentration of higher than 80% by weight and shows good fluidity. Accordingly, the adhesive can be coated by brushing, etc., and a sufficeint thickness (80 to 120 μm) of the adhesive layer can be obtained by one coating. That is, the adhesive shows good coating workability.

The reason why the above-described adhesive for use in this invention has a good fluidity as compared with adhesives prepared by using a polyol raw material containing conventional low molecular polyols has not yet been clarified but is presumed to be caused by that the hetero-atom chain

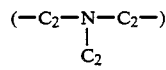

$$(-C_2-N-C_2-) \atop |  \atop C_2$$

of the heterocyclic ring is introduced into the the isocyanate prepolymer chain in place of a low molecular hydrocarbon chain ($C_2$ to $C_4$) to increase the freedom of the chain. Also, although the reason has not yet been clarified, triethanolamine is reluctant to cause gelation at the reaction with the polyisocyanate different from low molecular polyols and hence triethanolamine can be mixed with the high molecular polyol in an about equimolar amount as described above, which results in increasing the crosslinking density when the reaction pruduct is cured by water and hence the electrostatic flocking product having a sufficiently high abrasion resistance of the flocked surface under severe using conditions can be obtained.

In addition, directly before or after coating the adhesive, a catalyst generally used for curing polyurethane, such as triethylamine, triethylenediamine, dibutyltin dilaurate, etc., may be added to the adhesive.

Then, for understanding well this invention, the invention will be explained by referring to the following abrasion testes performed in the examples and comparison examples.

(1) Preparation of base material:

A base material was prepared by cutting a sheet material having a thickness of 2 mm produced by mold-curing an EPDM compound of the following components for 30 minutes at 160° C.

| EPDM | 100 parts by weight |
|---|---|
| Carbon black | 67.5 " |
| Mineral oil | 35 " |
| Zinc white | 5 " |
| Stearic acid | 1 " |

-continued

| Vulcanization accelerator | 2 " |
|---|---|
| Sulfur | 1.5 " |

(2) Preparation of adhesives:

To a mixture of polyol raw material (A) and polyisocyanate raw material (B) as shown in Table 1 below was added trichloroethylene so that the solid component concentration of about 83% by weight and the raw materials were reacted for 3 hours at 80° C. in the presence of $N_2$ gas to provide each adhesive. The viscosity of the adhesives thus obtained were about 500 to 1,200 cP. (at 20° C.).

In addition, the adhesive of Comparison example 5 by mixing a polyol raw material obtained by 1 mole of polypropylene glycol (mean molecular weight of 3,000) and 0.1 mole of ethylene glycol and a polyisocyanate raw material (4,4'-diphenylmethane diisocyanate) at an equivalent ratio of OH/NCO=¼, adding trichloroethylene to the mixture so that the solid component concentration became about 30%, and reacting both the raw materials as described above. The viscosity of the adhesive was about 3,000 cP. (at 20° C.).

TABLE 1

|  | Polyol raw material (A) | | Polyisocyanate raw material (B) |
|---|---|---|---|
|  | Polymer polyol*1 | Mole no. of TEA*2 | MDI mixing ratio (OH/NCO) |
| Comparison example 1 | PPT 3,000 | 0.3 | ¼ |
| Example 1 | " | 0.4 | " |
| Example 2 | " | 0.5 | " |
| Example 3 | " | 0.6 | " |
| Example 4 | " | 0.7 | " |
| Example 5 | PPT 2,000 | " | " |
| Example 6 | PPG 1,000 | " | " |
| Example 7 | PPT 3,000 | 0.8 | " |
| Example 8 | " | 0.9 | " |
| Example 9 | " | 1.0 | " |
| Example 10 | " | 1.3 | " |
| Example 11 | " | 1.5 | " |
| Comparison example 2 | " | 1.6 | " |
| Comparison example 3 | PPT 3,000 | 0.7 | 1/1.3 |
| Example 12 | " | " | ½ |
| Example 13 | " | " | 1/6.7 |
| Comparison example 4 | " | " | 1/7.3 |

*1: The figure after each abbreviation is a mean molecular weight.
*2: The mole number to 1 mole of the high molecular polyol.
TEA: Triethanolamine; MDI: 4,4'-Diphenylmethane-diisocyanate; PPT: Propylene oxide-glycerol reaction product; PPG: Polypropylene glycol.

(3) Preparation of electrostatic flocking product samples:

Each of the adhesives thus prepared as described above was coated on the base material prepared as described above by brushing at a dry thickness of about 100 μm and nylon piles (fineness: 3 deniers, length: 1.2 mm) were applied to the adhesive layer by electrostatic flocking according to an ordinary method. Thereafter, each sample was heated for 3 minutes in steam of 100° C. to cure the adhesive layer to provide an electrostatic flocking product.

(4) Abrasion test:

Each of the product samples thus obtained was subjected to each abrasion test in (1) normal state atmosphere, (2) normal state and wet atmosphere, (3) heat resisting wet atmosphere, (4) weather resisting wet atmosphere, or (5) high temperature atmosphere as follows. In addition, the test (3) was for the sample allowed to stand for one week at 80° C. and the test (4) was for the sample allowed to stand for 40 hours in a weatherometer (two carbon arc lamps).

A KE type abrasion test machine (rubbing member: glass of 3 mm thickness; load: 3 kg; cycle: 60 times/min.; stroke: 145 mm) and the rubbing times until the surface of the base material was exposed was measured (the upper limit was 30,000 times). In addition, the wet abrasion test was performed by immersing each sample in water for one hour, mounting the sample on the test machine, and spotting 2 ml of water to the rubbing surface each 2,000 times of the rubbing times.

The results thus obtained are shown in Table 2 below.

As shown in the table, each of the samples in the examples of this invention show excellent abrasion resistance in each test item. On the other hand, when the mixed mole number of triethanolamine is outside the range defined by this invention (Comparison examples 1 and 2), the compounding ratio of the polyisocyanate to the polyol is too small or too large (Comparison examples 3 and 4), and further low molecular polyols are incorporated in the polyol raw material in place of triethanolamine (Comparison example 5), the product samples are greatly inferior in each abrasion resistance to the samples of this invention.

TABLE 2

| Test example | Abrasion Test | | | | |
| --- | --- | --- | --- | --- | --- |
| | Normal state (× 100) | after wetting test (× 100) | after heat aging and after wetting test (× 100) | after weathering test and after wetting test (× 100) | High temperature atmosphere (× 100) |
| Comparison example 1 | 100 | 50 | 53 | 45 | 64 |
| Example 1 | 210 | 150 | 110 | 120 | 120 |
| Example 2 | " | 155 | " | 125 | " |
| Example 3 | " | " | " | " | 130 |
| Example 4 | " | 160 | 115 | 130 | " |
| Example 5 | " | 210 | 195 | 165 | 140 |
| Example 6 | " | " | 200 | 175 | " |
| Example 7 | " | 160 | 115 | 130 | 135 |
| Example 8 | " | 200 | 200 | 180 | 145 |
| Example 9 | " | " | 210 | " | " |
| Example 10 | " | " | 200 | 150 | 130 |
| Example 11 | 250 | 155 | 185 | 120 | " |
| Comparison example 2 | 100 | 50 | 70 | 30 | 31 |
| Comparison example 3 | 31 | 17 | 35 | 12 | 21 |
| Example 12 | 200 | 154 | 125 | 145 | 120 |
| Example 13 | 210 | 155 | 135 | 150 | 120 |
| Comparison example 4 | 100 | 15 | 35 | 9 | 51 |
| Comparison example 4 | 30 | 10 | 5 | 5 | 10 |

What is claimed is:

1. An electrostatic flocking product comprising a base material having fixed to the surface thereof flocks through an adhesive layer, wherein;
    (a) said adheisive layer is formed by polyurethane prepared by curing a mixture of an isocyanate prepolymer and polyisocyanate, with water, and
    (b) the polyol raw material for said isocyanate prepolymer is a mixture of 1 mole of high molecular weight polyol as the main component and 0.4 to 1.5 moles of triethanolamine.
2. The electrostatic flocking product as claimed in claim 1, wherein the polyol raw material of said isocyanate prepolymer is a mixture of 1 mole of the high molecular weight polyol as the main component and 0.6 to 1.0 mole of triethanolamine.
3. The electrostatic flocking product as claimed in claim 1, wherein the mean molecular weight of said high molecular weight polyol is 800 to 5,000.
4. The electrostatic flocking product as claimed in claim 1, wherein said mixture of the isocyanate polymer and polyisocyanate is obtained by the reaction of a polyol component and a polyisocyanate component at an equivalent ratio of OH/NCO=1/1.5 to 1/7.

* * * * *